UNITED STATES PATENT OFFICE.

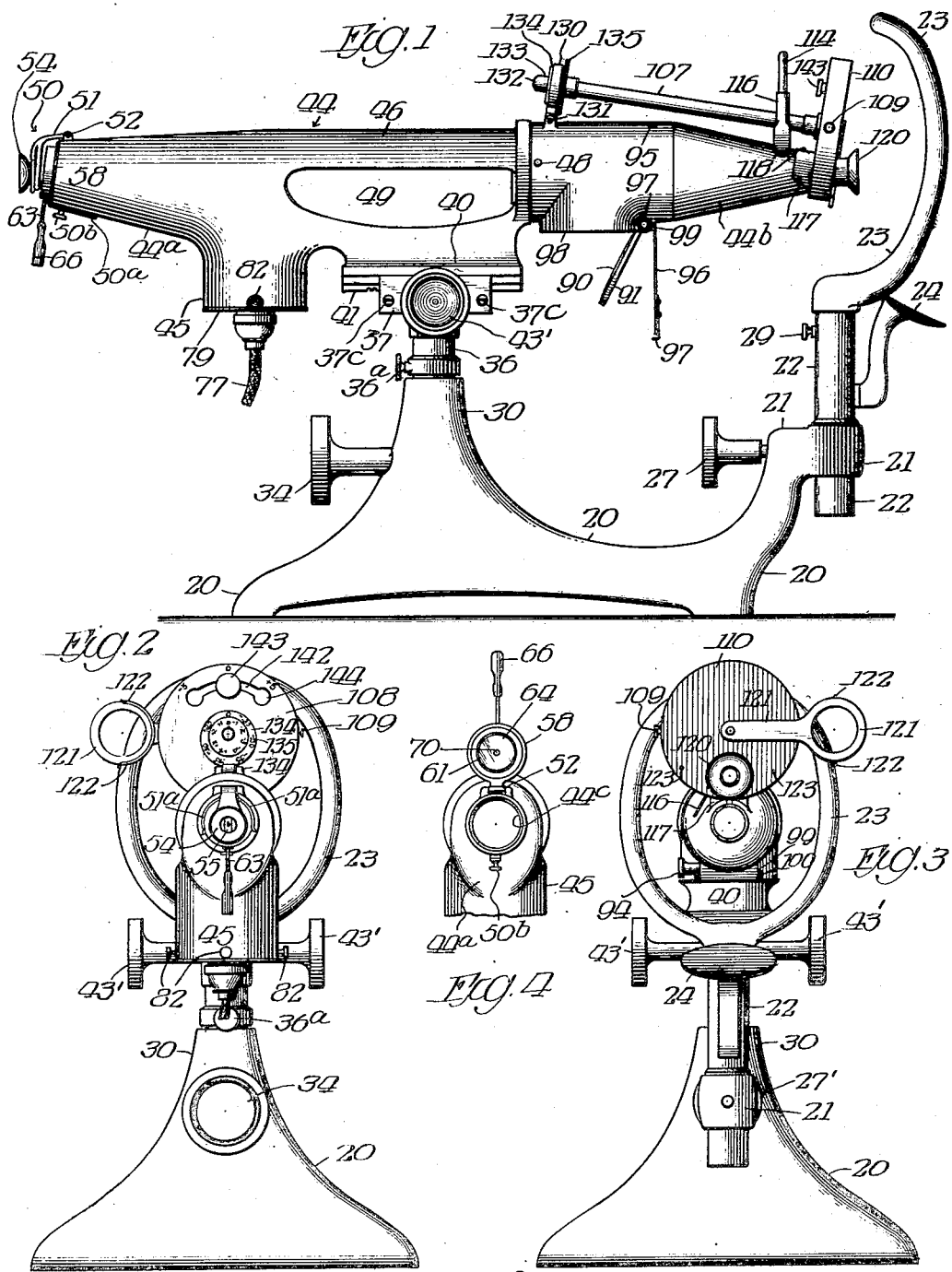

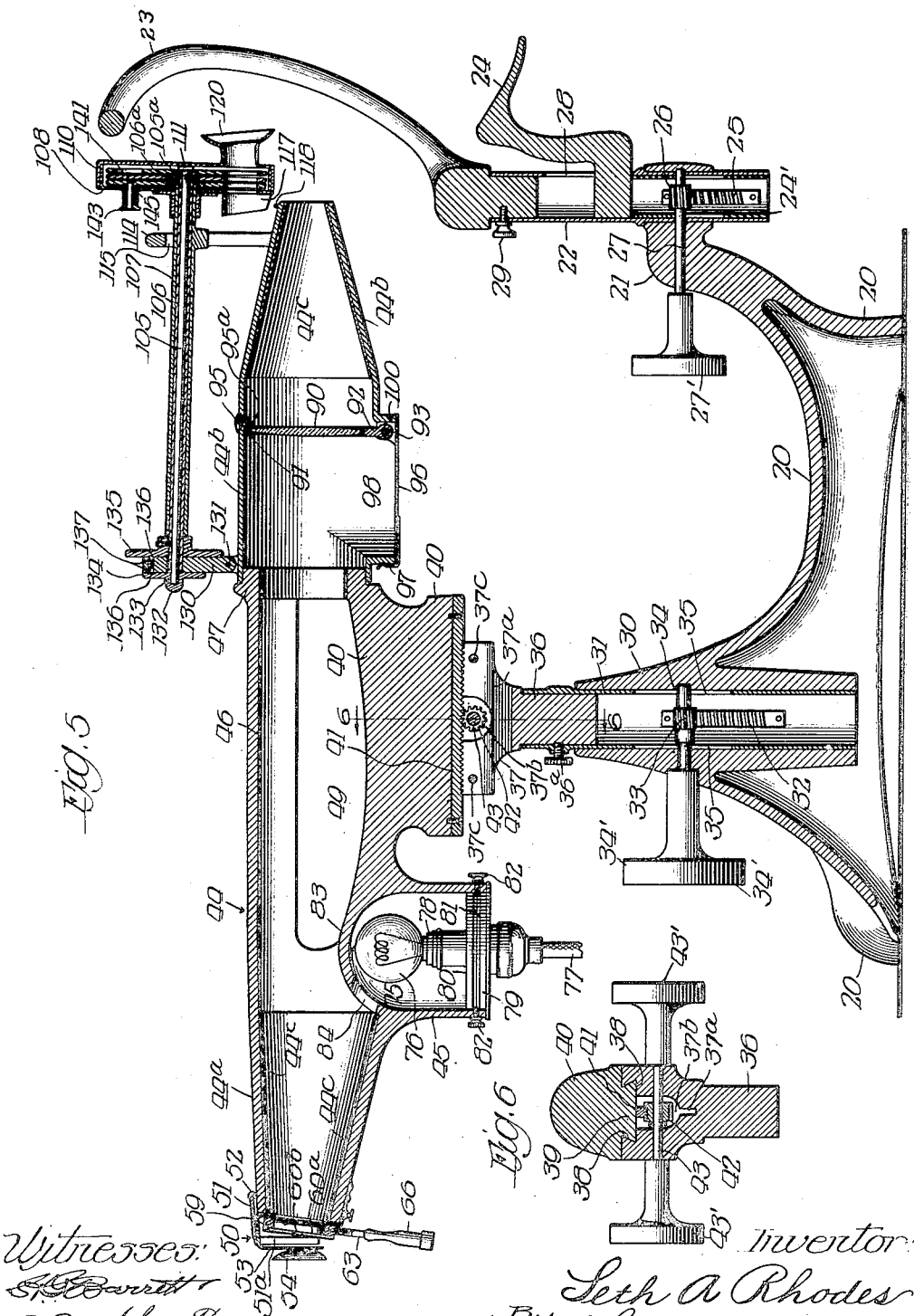

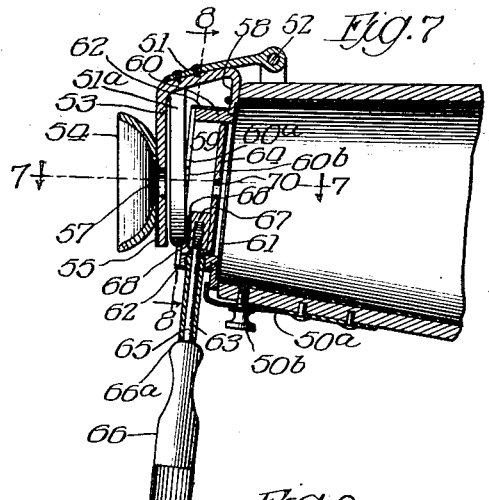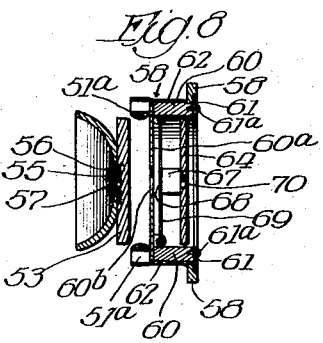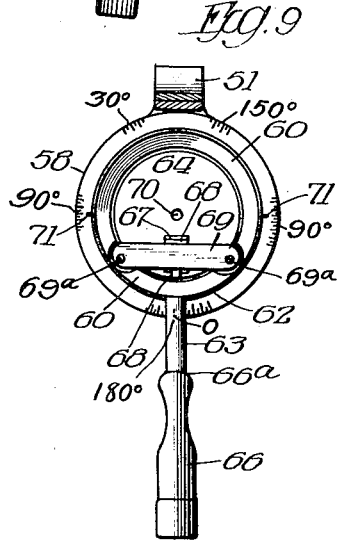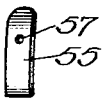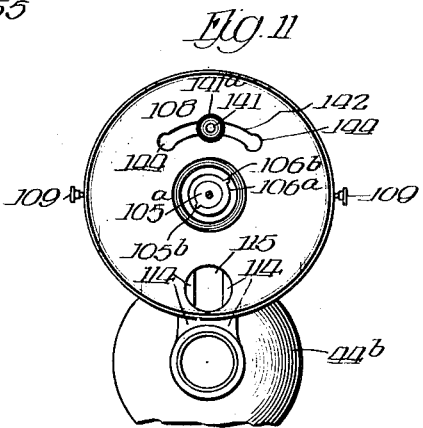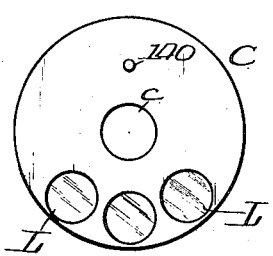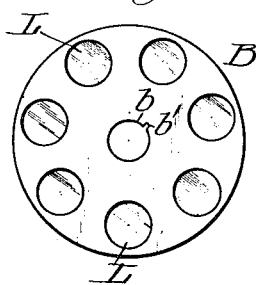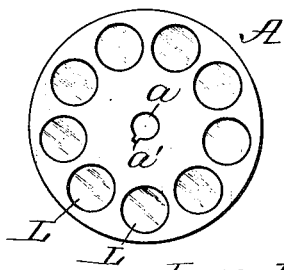

SETH A. RHODES, OF OAK PARK, ILLINOIS.

OPTICAL INSTRUMENT.

1,130,106.   Specification of Letters Patent.   Patented Mar. 2, 1915.

Application filed September 10, 1914. Serial No. 860,957.

*To all whom it may concern:*

Be it known that I, SETH A. RHODES, a resident of the village of Oak Park, in the county of Cook and State of Illinois, have invented certain new and useful Improvements in Optical Instruments, of which the following is a specification.

My invention relates to means for examining eyes, and is embodied in structure constituting a combined ophthalmoscope and retinoscope, the ophthalmoscope being adapted to illumine and magnify the interior of the eye whereby its pathological conditions may be observed, and the retinoscope for making what is known as the "shadow test" whereby the presence and extent of refractive errors are ascertained.

The principal objects of the present invention are to provide means whereby a complete and accurate examination of a patient's eyes may be made, and in a comparatively short space of time, thus avoiding the fatigue to the patient incident to a protracted examination, and, very importantly, the fatigue to the patient's eyes operating to defeat the success of the examination; further, and more specifically, to provide means whereby a shadow movement is attained which is clear, sharply defined, and true to the error of the eye, and whereby false shadow movements, including misleading impressions upon the operator, are avoided. Further, to provide means whereby a highly magnified and clear view of the retina of the eye may be had in its true colors and proportions—a view in which the field is substantially coextensive with the expanse of the retina and evenly illuminated.

A further object is to make the work of the operator during the examination simpler and with less strain and fatigue to his own eyes, this advantage contributing also to the success of the examination.

A further object is to improve details of construction and arrangement of coöperative parts over heretofore suggested devices of the character described.

Further objects will appear hereinafter.

In the accompanying drawings, which form a part of this specification, I have illustrated a preferred embodiment of improvements providing these important advantages, in which drawings, Figure 1 is a side elevation of the instrument complete, the arrangement being for retinoscopic use, except that the ophthalmoscopic lens casing is shown open and the lens exposed for purposes of illustration; Fig. 2 is an end view of the device of Fig. 1 from the operator's station, the retinoscopic lens device having been moved to its raised or out-of-the-way position; Fig. 3 is an end view from the patient's station, the parts being in the same relative position as in Fig. 2; Fig. 4 is a fragmentary detail showing in end view the operator's eye-piece elevated on its pivot and the reflecting mirror exposed; Fig. 5 is an enlarged longitudinal vertical section medially through the instrument of Fig. 1, the parts being shown in their relative positions for ophthalmoscopic use; Fig. 6 is a fragmentary transverse vertical section as on the line 6—6 of Fig. 5; Fig. 7 is an enlarged fragmentary section on a vertical plane medially through the operator's eye-piece and the contiguous parts; Fig. 8 is a sectional view of the operator's eye-piece on a horizontal plane, as on the line 7—7 of Fig. 7 viewed on the direction of the arrows; Fig. 9 is a view of the rear side of the reflecting mirror and associated parts as on the line 8—8 of Fig. 7; Fig. 10 is an enlarged perspective of the sliding element containing the operator's peep-hole, it being slightly curved to provide spring-like holding resistance when in position; Fig. 11 is a face view of the device for holding the battery of lenses, the cover being removed, the device being shown in a raised position; Figs. 12, 13 and 14 are face views of disks containing retinoscopic lenses.

The base 20 is preferably formed with a supporting projection 21 vertically bored to receive the preferably hollow stem 22 for the bowed and ring-like face or head rest 23. The chin rest 24 is preferably secured to an inner tubular sliding element 24' which is preferably provided with the rack 25, the teeth of which are in mesh with the pinion 26 rigid with the shaft 27 and the axially disposed knob or handle 27', a slot-like opening 28 in the stem 22 permitting the chin rest to be raised and lowered when the handle 27' is partially rotated. A screw 29 secures the face-rest 23 to the stem 22. The projection 30 of the base 20 is vertically bored to permit the sliding therein of the preferably tubular stem 31, on the inside of which stem is preferably secured a rack 32 intermeshing with the pinion 33 rigid with the shaft 34 pivoted in the projection 30 and carrying the knobs or handles 34'. Slots 35 in the tube 31 for the shaft 34 permit this tube to be raised and lowered by turning the handle 34'.

The stem or supporting element 31 accommodates the stud 36, which has rigid and preferably integrally upon its upper end the block 37, which block 37 is provided with a centrally longitudinally disposed groove or recess 38 constituting a guideway, preferably of dove-tail cross section, within which guideway is adapted slidingly to fit the projection 39 of the block 40 corresponding in cross section to the groove 38. The block 40 is provided with a longitudinal rack 41 and the block 37 has the pinion 42 rigid with the shaft 43 journaled in the block 37 and carrying the knobs or handles 43'. The block 37 is vertically split centrally by the cut or narrow but deep groove 37$^a$ and is hollowed interiorly at 37$^b$ to accommodate the pinion 42. Transverse binding screws 37$^c$ serve to provide adjustment between the sliding surfaces of the blocks.

The block 40 is preferably integrally formed as part of the frame or inspection head 44, and it is apparent that as one of the handles 43' is axially turned this head 44 will be moved longitudinally of the head with respect to the base. As the pin or stud 36 is loosely positioned in the stem 31 it is obvious that the head 44 may be partially or completely rotated on the pin 36 as its axis. A set screw 36$^a$ is adapted to hold the head 44 in a fixed position with respect to rotative movement when so desired.

The inspection frame or head 44 comprises, in its preferred form, two tubular elements 44$^a$ and 44$^b$, each thereof being suitably a casting, and which I make both in gray iron and aluminum, which is also the preferred alternative construction of the base 20, block 37, face rest 23, and chin rest 24. In this preferred construction the casting 44$^a$ includes the block 40, the housing 45 for a source of light and the cover 46, the casting being provided with an annular flange 47 over which the end of the tubular element 44$^b$ extends and to which it is suitably secured as by screws 48. Each of these tubular elements 44$^a$ and 44$^b$ has a hollow interior providing a path of vision from one end to the other of the head 44, and the hollow interior of each of these elements respectively preferably tapers to its outer end, thus providing a reduced crossed area of the interior at these ends. The cover 46 serves not only to provide a strong construction contributing to efficacy, but is important from the standpoint of preventing rays of light which are traveling from a source substantially higher than the plane of said cover from interfering with the rays of light passing longitudinally through the head, and to this end the sides of the cover 46 are preferably made to extend downward to about the horizontal plane of the line of vision longitudinally through the head. The open space 49 thus provided between the tubular members 44$^a$ and 44$^b$ is important not only from the standpoint of lightening the construction and facilitating assembling, but also in providing access to the interior of each adjacent tubular element for cleaning the same of dust settling upon the inner walls and which would produce reflection of light inimical to the best results. An important function is also in permitting escape of heated air within the head 44 which might otherwise affect the patient's eye.

At the outer end of the member 44$^a$ is provided an operator's eye piece 50 which comprises a support 51 in the nature of a hinge strap pivotally connected, as at 52, with the element 44$^a$. To the depending plate-like extension 53 of the support 51 is secured the operator's eye-cup 54, the extension 53 being provided with movable means preferably consisting of a slide 55 operating in the guideway 56, and having a peep-hole 57. Also connected with the support 51 is a pair of curved springs 51$^a$ adapted to provide a clip or spring-pressed seat for a correction lens to overcome the visual defects of the operator and enable him to dispense with the wearing of glasses during the examination. Also connected to the support 51 is the annular frame 58 within which is slidably mounted for rotation an inner frame 59, which inner frame preferably consists of an annulus 60 surrounded, in tightly fitting and fixed relation, by the band 62 adapted to bear against one side of the frame 58, the annulus 60 extending beyond the band 62 slightly forming a bearing for the inner frame 59 against the inner edge of the frame 58, and a light flat ring 61 secured as by screws 61$^a$ against the annulus 60, the frame 58 being slightly concentrically recessed, as illustrated, to accommodate the ring 61. It will thus readily be appreciated that the inner frame 59 may be rocked relative to the frame 58 on an axis at right angles to the general plane of the two. A hollow stem 63 is threaded into the band 62 and annulus 60. A light-reflecting mirror 64, preferably circular in outline and shown as plano, is positioned within the annulus 60 and maintained there by a threaded pin 65 having a handle 66 and adapted to be screwed into the projection 67 rigid upon the back of the mirror 64. This projection 67 is provided with a flat face 68 which is engaged by the suitably flat spring 69 secured, as by screws 69$^a$ at each end, to the annulus 60. In practice it is highly important that the mirror 64 be normally maintained in a plane at right angles to its axis of rotation in whatever radial position the handle 66 may be. This notable advantage is secured initially and from time to time as occasion may require by retracting one of the screws 69ª and tightening the other, this feature of adjustment also permitting the tension of the spring 69 to be varied. The inner end of the hollow stem 63 preferably extends slightly beyond the annulus 60, and the arrangement of the handle 66 is such that when the pin 65 is screwed into the projection 67 the end 66ª of the handle 66 acts as a head binding the stem 63 tightly between the projection 67 and the portion 66ª and causing a substantially tight connection between the handle and the mirror sufficient to enable tilting of the mirror in either direction on its axis in line with the handle and on a substantially diametric line through the peep-hole 70 centrally in the mirror 64, this tilting being against the resistance of the spring 69, the tension of the spring returning the mirror to its normal position when the finger of the operator is removed. The mirror peep-hole 70 is preferably somewhat larger than the peep-hole 57. A cover 60ª having a comparatively large central opening 60ᵇ fits tightly upon one side of the annulus 60, being spring-held by a projecting edge of the band 62.

The adjustability of the peep-hole 57 is important in that during the examining operation the best results are attained when the line of vision between the patient's eye and the peep-hole 57 passes close to an edge of the peep-hole 70 in the mirror, the degree of which closeness may vary slightly in individual instruments due to variations of construction or may vary during the life of the same instrument owing to accident or wear. With one of the peep-holes 57 or 70 (preferably 57) adjustable with respect to the other a very high degree of accuracy and refinement in operating results is secured. This adjustable feature is also important from the standpoint of manufacture, as a slight variation is likely to occur in the construction of these parts.

The frame 58 is provided with a scale beginning at zero with marks indicating the three hundred and sixty degrees of a circle. This scale is preferably marked on the right hand side as viewed by the operator from 0 at the bottom to say 150° near the top, and on the left hand side in a descending order from say 30° near the top to 180° at the bottom, the zero and the 180° marks coinciding. This scale is indicated in Fig. 9. The annulus 60 and band 62 carry pins 71 constituting a pointer, either of which is positioned at zero when the handle 66 is on a substantially horizontal plane, in which relative position of parts the mirror tilts on a substantially horizontal axis when in operation. Although the handle 66 may not describe a complete circle, owing to the interference by the support 51, the arrangement of the numbering of the degrees, as already indicated, is such that a pointer 71 may be brought opposite any desired degree from zero to three hundred and sixty. The pivotal mounting at 52 of the eye-piece 50 as a whole permits it to be swung upward whereby the mirror, which normally faces toward the patient, is exposed outwardly, as for cleaning, substitution or repair of parts. It also facilitates cleaning of the interior of the tubular element 44ª, and also ready examination of the source of light as to its intensity. A spring catch 50ª on the head 44ª and controlled by a thumb screw 50ᵇ holds the eye-piece 50 firmly against the end of the element 44ª when in use.

The chamber casing 45 is preferably integrally formed with the member 44ª and is preferably positioned upon a vertical plane longitudinally through the middle of the head 44, and preferably on the underside thereof as shown. The hollow interior 75 of the casing 45 preferably extends somewhat into the general interior area of the element 44ª and constitutes a receptacle or chamber for the source of light 76, preferably an electric lamp, and preferably with the glass "frosted," connected by the flexible conductor-containing cord 77 with any suitable source of current. The lamp 76 is screwed into a socket 78 on a plug or cover 79 having a projection 80 with an annular groove 81 adapted to be engaged by the points of screws 82, this base or cover 79 thus being securely yet readily removably held in proper position. The hollow interior 75 has its upper portion defined by a wall 83 projecting into the general area of the interior of the tubular element 44ª, a hole or light shaft 84 being provided at a suitable angle between the hollow interior 75 and the interior of the element 44ª. The top of the wall 83 is necessarily lower than the line of vision between the peep-hole 54 and the patient's eye, but it need be only slightly lower, and the arrangement permits the source of light to be brought relatively close to the line of vision mentioned. The opening or light shaft 84 is so directed and is of such limited cross area that condensed rays of light are projected from the source 76 directly upon the mirror 64, the mirror 64 being normally at such an angle that a beam of light from the source 76 is reflected medially through the head 44 and into the patient's eye when properly positioned. I have thus secured an arrangement whereby the angle of incidence and reflection of light beams is comparatively small, which naturally gives a stronger and less diffused light in the patient's eye than where the angle is greater. The wall 83 prevents all but reflected light from entering the patient's eye and the peep-hole 57 is at such distance from the peep-hole 70 that all beams of light from the source 76 passing through the peep hole 70 fall above the peep hole 57, thus preventing the operator from having direct rays in his operating eye. I have also thus provided a relatively fixed source of light, as distinguished from a light which heretofore has been thought most suitable at one or the other side of the instrument and being shiftable from one side to the other during the examination of the patient's two eyes. The provision of a fixed source of light permits the examination to be made more quickly, thereby relieving both the patient and the operator of nervous strain and contributing to a better result. It also permits one permanent and accurate relative adjustment of parts—one adapted to the best results—to suffice for all of the operations, thus avoiding the uncertainty of results where the light must be adjusted from time to time. The positioning of the light in a relatively small container below the element 44$^a$ removes it from the lines of vision outside the instrument between the operator and patient, which is important since it is necessary for the operator to secure the patient's attention from time to time with the eye not being examined, and the positioning of the source of light within this outer field of vision has proven objectionable in practice. Quite importantly too, the operator is not affected by a strong light in his direction when viewing the patient outside the instrument.

The tubular element 44$^b$ is provided with an ophthalmoscope lens 90 mounted within an annular ring or support 91 provided with a projection 92, and a wall of the element 44$^b$ is suitably formed whereby the hinge pin 93 rigidly secured to the projection 92 makes a pivotal connection for the lens 90, a knurled thumb-piece or head 94 on the pin 93 permitting the operator to swing the lens 90 into and out of the path of vision through the head 44 as desired. A stop 95, consisting preferably of a screw threaded into and extending through a wall of the element 44$^b$ limits the movement of the lens 90 to its desired slightly tilted position for ophthalmoscopic use. This stop 95 is preferably a screw having a stop projection 95$^a$ eccentrically arranged whereby by turning the screw the lens 90 may be stopped at a greater or less slight angle to a vertical plane, the line of vision being horizontal. Unless this lens is slightly tilted (preferably with the top toward the patient) its reflection of light toward the operator prevents his obtaining a clear view of the patient's eye. The tubular element 44$^b$ is formed at the bottom, as illustrated, to constitute a housing for the lens 90 when turned into a substantially horizontal position, that is, out of the path of vision through the head, and a light metal cover 96 having a spring catch 97 is adapted to close the circular opening 98 of this housing to exclude light and protect the lens 90, the cover 96 having upstanding ears 99 aperfured to receive the screws 100 threaded into the casting 44$^b$, the cover being thus hingedly mounted. The lens 90 may thus be readily cleaned as desired.

Preferably at the top of the tubular element 44$^b$ I provide a retinoscope device containing a plurality of lenses of such variations in strength, both plus and minus, that any degree of refractive error up to say 9.75 diopters may be ascertained, this battery of lenses being self contained with the instrument, and movably mounted whereby one or more lenses may be moved into the path of vision through the instrument and in line with the patient's eye, and be moved and maintained out of such position when the instrument is employed as an ophthalmoscope. The preferred structure embodying the features last mentioned comprises a plurality of disks A, B and C, each thereof having a plurality of retinoscopic lenses L concentrically arranged and equally distant from the axis of rotation. The lenses of the disk A are denominated as zero, plus 1, plus 2, plus 3, plus 4, minus 1, minus 2, minus 3, and minus 4 diopters respectively. The lenses of the disk B are of strength denominated as zero, plus .25, plus .50, plus .75, minus .25, minus .50, and minus .75 diopters respectively. The lenses of the disk C are denominated as zero, plus 5 and minus 5 diopters respectively. The disk A is carried by the central shaft 105, the disk B being similarly carried by the hollow shaft 106 adapted to rotate around the central shaft 105. The hollow shaft 106 is mounted to rotate within the hollow support, suitably a piece of tubing, 107, which support 107 carries the disk-like flanged plate 108, upon which plate is secured as by the screws 109, the flanged cover 110, the screws 109 being readily removable by the fingers permitting the cover 110 to be removed, and the further removal of the thumb-screw 111 threaded in the end of the shaft 105 permitting all of the disks to be removed from their respective mountings, as for cleaning. It will be noted that the central openings $a$, $b$ and $c$ of the disks A, B and C respectively are of different diameters, thus preventing improper assembling by any operator, each of the shafts 105 and 106 having a mounting 105$^a$ and 106$^a$ of a corresponding diameter to that of the disks respectively, the mounting 106$^a$ being also a mounting for the disk C. Radially projecting pins 105$^b$ and 106$^b$ adapted to interfit with recesses a' and b' of the disks A and B carry the disks around when the shafts 105 and 106 are rotated. By arbitrarily marking on the side of each disk normally toward the patient the proper assembling of these disks is made certain. The disk C has a hole or recess 140 adapted to receive the end of the pin 141 adapted to travel in an arcuate slot 142 in the plate 108, a spring-pressed head 143 on the pin 141 holding the disk C in the desired position with any of its three lenses in alinement with the patient's eye-piece 120, the arcuate slot 141 having enlargements, as 144, adapted to receive a reduced portion 145 of the head 143. When the head 143 is drawn away from the plate 108 against the washer 141ᵃ on the pin 141 the reduced portion 144 comes out of one of the enlarged openings 143 and the pin may be moved through the slot 141 to another of the openings 143 partially rotating the disk C and be there held. When so held one of the lenses of disk C is opposite the eye-piece 120. The plate 108 is also provided with numbers indicating plus and minus diopter lenses on the disk C.

A guide 114 having a slot 115 is rigid with the tubular element 44ᵇ and is adapted to limit the movement of the support 107 as it is raised and lowered, a pivoted spring-catch 116 on the guide 115 maintaining the support 107 and associated parts in their raised position when the instrument is used as an opthalmoscope. The plate 108 is provided with a hood or apron 117 adapted to fit over the upper portion of the end of the element 44ᵇ and constituting both a rest for the lens-battery mechanism as well as means for excluding light at this joint. A pin 118 projecting from the element 44ᵇ is adapted to enter a hole in the rest 117 maintaining the lens-battery mechanism in fixed and proper relation to the end of the element 44ᵇ. The casing 110 is provided with a patient's eye-cup 120, the casing 110 and the plate 108 both being apertured to provide a path of vision through the eye-piece 120, one of each of the lenses of the disk A, B and C (which register with each other at this place), and the tubular element 44ᵇ. The arm 121 pivoted centrally on the casing 110 is provided with spring arms 122 adapted to hold a "fogging" lens for the eye not under examination, the arm 121 being movable from side to side so as to permit the "fogging" lens to be employed with either eye, stop pins 123 on the casing 110 maintaining the "fogging" lens in the desired position opposite the patient's free eye.

The central shaft 105 extends rotatably through a hole in the block or mounting 130 pivoted to the tubular element 44ᵇ by the pin 131, a cap 132 being secured by a set screw 133 upon the exposed end of the shaft 105. This cap 132 has a flange or hand wheel 134 bearing against a face of the mounting 130 and provided with a series of numbers corresponding with the power of the lenses on the disk A. The shaft 106 carries the flange or hand wheel 135 bearing against the opposite face of the mounting 130, and the supporting tube 107 has its inner end bearing against the disk 135. The disk 135 has numbers corresponding with the strength of the lenses on the disk B these disk numbers being toward the operator, and for convenience, I indicate the plus numbers by white figures and the minus numbers by figures in red. Each of the wheels 134 and 135 is provided with concentrically arranged shallow recesses 136 and the mounting 130 has oppositely disposed outwardly spring-pressed balls 137 adapted to be forced into the recesses 136 in the wheels or disks 134 and 135 respectively whereby any of the respective lenses on the disks A and B is maintained in proper alinement with the path of vision through the head 44 and the eye-piece 120. By turning the wheels 134 and 135 any desired combination of the lenses of the disks A and B in line with the patient's eye may be had.

Each of the tubular elements 44ᵃ and 44ᵇ is interiorly lined with a material 44ᶜ adapted to absorb diverging rays of light from the mirror 64 and prevent their reflection, as well as reflection from the ophthalmoscope lens, which is highly important. I have experimented with many kinds of fabrics for this purpose and find that black velvet gives the best results I have been able to obtain.

In practice the patient's eye is usually first examined pathologically, for which purpose the battery of lenses is moved out of the way and held by the spring clip 116. The lens 90 is swung upward against the stop 95, the cover 96 closing the opening 98. With the patient's chin on the chin rest and his forehead against the open support 23 the eye may be brought in line with the path of vision through the head 44 by turning the knob 34'. Looking past the side of the instrument (the line of vision being unobstructed in my present device) the operator adjusts the head 44 by turning the focusing knob 43 so that the black dot, which is the image of the hole in the mirror, appears sharply defined on the sclera or iris. The head 44 is then slightly moved horizontally on its vertical axis so that the black dot just enters the nasal side of the pupil. A finger of the operator is preferably held up as a target for the free eye of the patient during this operation. Looking through the peephole in the operator's cup the retina is seen directly in the optic disk when the hand used as a target is about eight inches from about the middle and at the side of the instrument. A further exploration of the retinal region is accomplished by moving the finger of the operator about, the patient looking at it the while.

When using the instrument as a retinoscope the lens 90 is turned to its horizontal or out-of-the-way position and the retinoscope lenses lowered by releasing the spring catch 116. The patient's eye is now very close to the eye-piece 120. A "fogging" lens is placed in the holder 121, and the patient is directed to read from a chart at some distance away, thus inducing relaxation of the accommodation in the eye to be examined. Looking through the peep-hole at the operator's end of the instrument if the reflex is not of the proper color, that is, vermilion or orange red, the attention of the patient's free eye should be directed to the chart through the "fogging" lens until the proper color is attained. The mirror 64 is now slowly tilted back and forth and the movement of the shadow and reflex as it appears in the patient's pupil is noted. In the use of the present instrument a sharply defined shadow is produced. If the shadow does not travel true to the meridian in which the mirror is being tilted it is apparent that astigmatism is present, and the handle of the mirror is turned with the peep-hole as its axis until the tilting of the mirror is true to the movement of the shadow. A reading of the scale on the frame 58 shows the degree of the refractive error found.

When the mirror used in this instrument is plano, when the shadow moves "with" the case is one of hypermetropia and when the movement is "against" myopia is indicated. The power of the lenses respectively on the disks A, B and C is preferably such that for the working distance of the instrument the numbers on the wheels 134 and 135 and the plate 108 are correct. No deductions, therefore, from the readings therefrom are required. Errors of higher degree than the scope of the instrument, if any be found, are easily handled by the operator's trial case.

The invention is not limited to the specific arrangement of parts and details of construction shown, as various modifications thereof may be made by persons skilled in the art without departing from the spirit of the disclosure made. Reference should therefore be had to the appended claims to determine the scope of the improvements herein set forth, and all departures from what is specifically illustrated are contemplated by me as fall within the scope of these claims.

I claim:

1. In an optical instrument, the combination of an eye-piece comprising an element provided with a peep-hole, and a light-reflecting mirror having a peep-hole substantially in alinement with the peep-hole in said eye-piece, one of said peep-hole elements having provisions whereby the peep-hole thereof is adjustable with respect to the other peep-hole.

2. In an optical instrument, an eye-piece having a relatively movable element containing a peep-hole, the relative movability of said element providing adjustability of said peep-hole.

3. In an optical instrument, an eye-piece having a guideway therein, a slide in said guideway, said slide being provided with a peep-hole.

4. In an optical instrument, an eye-piece having a relatively movable element provided with a peep-hole, a light-reflecting mirror provided with a peep-hole substantially in alinement with said other peep-hole, the movability of said movable element being adapted to provide a line of vision through said two peep-holes at different points in the area of the peep-hole through said mirror.

5. In an optical instrument, an eye piece provided with a guideway, a slidable element in said guideway, said slidable element having a peep-hole, a light-reflecting mirror having a peep-hole therein substantially in alinement with said other peep-hole, the slidability of said slidable element being adapted to provide a line of vision through said two peep-holes at various points in the area of the peep-hole of said mirror.

6. In an optical instrument, the combination of a light-reflecting mirror, mounted to tilt substantially on a diametric axis, said mirror having a peep-hole therethrough, an eye-piece operatively associated with said mirror, said eye-piece having a movable element, said movable element having a peep-hole whereby a line of vision is provided through said two peep-holes, the movability of said movable element being adapted to provide adjustability of said movable element peep-hole with respect to said mirror peep-hole.

7. In an optical instrument, the combination of a light-reflecting mirror mounted to tilt substantially on a diametric axis, said mirror having a peep-hole substantially in the center thereof, said mirror being mounted to rock as on an axis passing through said peep-hole, an eye-piece associated with said mirror, said eye piece having a peep-hole, said eye-piece having provisions whereby the peep-hole therein is adjustable with respect to the peep-hole in said mirror.

8. In an optical instrument, the combination of a light-reflecting mirror mounted for tilting back and forth out of its normal plane on a substantially diametric axis, a handle for tilting the mirror, and a single spring adapted to maintain said mirror normally in a predetermined relative position, said spring being adapted to yield when said handle is moved to tilt the mirror in either direction.

9. In an optical instrument, a light-reflecting mirror, having a peep-hole therethrough, the rear portion of said mirror having a projection with a substantially flat face, said mirror having a supporting frame, a single spring secured to said frame and contacting said flat face whereby said mirror is normally maintained in a predetermined relative position with respect to said frame, means for tilting said mirror in two directions, the tilting of the mirror in either direction being against the resistance of said spring, said spring being adjustably mounted to provide adjustment of the normal relative position of said mirror.

10. In an optical instrument, the combination of an eye-piece comprising a frame and a reflecting mirror in said frame, an inspection head comprising a tubular member, said frame being pivotally mounted on said tubular member at an end thereof with said mirror toward the hollow interior of said tubular member, the arrangement being such that said eye-piece may be pivotally moved to expose said mirror.

11. In an optical instrument, the combination of a suitable base, an inspection head comprising a tubular element on said base, an eye-piece and a reflecting mirror at one end of said tubular element, wall elements of said tubular element forming a chamber beneath a central line longitudinally through said tubular element and adapted to accommodate a source of light, the hollow interior of said tubular element at said chamber being provided with a hood-like projection having an opening toward said mirror, said hood-like projection forming the upper wall of said chamber, a source of light in said chamber close to said upper wall, the arrangement being such that a beam of light from said source will fall upon said mirror and be reflected lengthwise through said tubular element, said hood-like projection being adapted to prevent all but reflected light from said source from emerging from the end of said tubular element opposite said mirror.

12. In an optical instrument the combination with a suitable base, of an inspection head pivotally mounted thereon, said inspection head comprising two tubular members extending in opposite directions and with a common medial line, said tubular members being spaced apart and providing an open space between the two, a cover extending from one tubular member to the other bridging said open space at the top thereof, said cover being adapted to prevent rays of light from an elevation substantially higher than the instrument from interfering with rays of light passing through said head, a source of light on said inspection head, and a reflecting mirror at the outer end portion of one of said tubular members, the arrangement being such that a beam of light will pass from said source to said mirror and be reflected through said inspection head.

13. In an optical instrument, an inspection head comprising two tubular members having a common central longitudinal line, said tubular members being spaced apart medially, a cover extending from one tubular element to the other bridging the open space between them, the sides of said cover extending downward from the top thereof substantially to the horizontal plane of the central line mentioned, an operator's eye piece at one end of said head, and means for positioning a patient's head at the other end thereof.

14. In an optical instrument, the combination of an inspection head comprising a tubular member having a path of vision therethrough, an ophthalmoscope lens and a retinoscope mounted on said tubular member for movement whereby either of said lenses may be moved into and out of the path of vision through said head, and a head rest adapted to position a patient's head with an eye thereof opposite one end of said tubular member.

15. In an optical instrument, the combination of an inspection head comprising a tubular member having a path of vision therethrough, said tubular member having an ophthalmoscope lens movably mounted therein whereby the lens may be moved into and out of the path of vision through said head, and a retinoscope lens movably mounted on said head and adapted to be moved into and out of the path of vision through said head, and means for positioning a patient's head with an eye thereof opposite the end of said tubular member.

16. In an optical instrument, an inspection head comprising a tubular member through which the operator may view the eye of a patient, an ophthalmoscope lens pivotally mounted in one wall of said tubular member and adapted to swing into and out of the path of vision through said tubular member, and a plurality of retinoscope lenses movably mounted on said tubular member whereby any one of said lenses may be moved into and out of such path of vision.

17. In an optical instrument, an inspection head comprising an operator's eye-piece and a tiltable mirror at one end thereof, a source of light adapted to cast a beam upon said mirror, said mirror being adapted to reflect said beam throughout the length of said head, said eye-piece and said mirror each having a peep-hole therethrough, the end portion of said head opposite said first mentioned end being provided with an ophthalmoscope lens pivotally mounted so as to swing into and out of the path of vision through said head, and a plurality of retinoscope lenses movably mounted on said second mentioned end portion whereby any one of said lenses may be moved into and out of the path of vision through said head, and a patient's head rest for supporting the patient's head with an eye thereof in line with the path of vision through said head.

18. In an optical instrument, the combination with an inspection head having a path of vision therethrough, of an ophthalmoscope lens pivotally mounted to swing into and out of said path of vision, and a plurality of retinoscope lenses concentrically arranged on a disk and mounted for rotation on said head, said disk being mounted also to be moved so that the circular path of movement of said lenses may come into and out of the line of vision through said head, and means for rotatably moving said disk.

19. In an optical instrument, the combination with a tubular element having a path of vision therethrough, of an ophthalmoscope lens pivotally mounted in a wall of said tubular element and adapted to be moved into and out of such path of vision, and a stop arranged to limit the movement of said lens across said line of vision, said stop having provisions for adjustment whereby the movement of said lens may be limited with the same at slight angles to such path of vision.

20. In an ophthalmoscopic instrument, the combination of an operator's eye piece, a tubular element having provisions for a patient's eye, there being a path of vision from said eye piece through said tubular element, an ophthalmoscope lens pivotally mounted in said tubular element for movement into and out of said path of vision, a wall of said tubular element having an opening adapted to provide a path of movement for said lens whereby the same may extend through said wall, and a cover adapted to close said opening.

21. In an optical instrument, the combination of a light-reflecting mirror mounted to tilt back and forth out of its normal light-reflecting plane, and spring means for holding said mirror yieldingly in its normal light-reflecting plane, said spring means being adjustable to vary the normal relative light-reflecting position of said mirror.

22. In an optical instrument, the combination of a suitable base, an inspection head comprising a tubular element on said base, an eye piece and a reflecting mirror at one end of said tubular element, means providing a source of light so arranged in said tubular element as to throw direct rays through said tubular element upon said mirror, said mirror being adapted to reflect such rays longitudinally through said tubular element, said source of light extending substantially within the hollow interior of said tubular element, the arrangement being such that direct rays from said source proceed only through said tubular element and in the direction of said mirror.

SETH A. RHODES.

Witnesses:
T. D. BUTLER,
M. M. KRIESAND.